United States Patent
Viviani et al.

(10) Patent No.: US 9,935,541 B1
(45) Date of Patent: Apr. 3, 2018

(54) FLOATING CHARGE PUMP VOLTAGE CONVERTER

(71) Applicant: IML International, Grand Cayman (KY)

(72) Inventors: Alberto Giovanni Viviani, Mountain View, CA (US); Dimitry Goder, San Jose, CA (US)

(73) Assignee: IML International, Grand Cayman (KY)

( * ) Notice: Subject to any disclaimer, the term of this patent is extended or adjusted under 35 U.S.C. 154(b) by 0 days.

(21) Appl. No.: 15/614,562

(22) Filed: Jun. 5, 2017

Related U.S. Application Data (63) Continuation of application No. 14/455,753, filed on Aug. 8, 2014, now Pat. No. 9,673,699.

(60) Provisional application No. 61/863,820, filed on Aug. 8, 2013.

(51) Int. Cl.
*H02M 3/07* (2006.01)
*H02M 1/00* (2006.01)

(52) U.S. Cl.
CPC ........ *H02M 3/07* (2013.01); *H02M 2001/007* (2013.01)

(58) Field of Classification Search
CPC .. H02M 3/155; H02M 3/07; H02M 2001/007; H02M 2001/0077; H02M 2001/008; H02M 2001/009; H02M 2003/0072; H02M 3/04
See application file for complete search history.

(56) References Cited

U.S. PATENT DOCUMENTS

| | | | |
|---|---|---|---|
| 2003/0067289 A1* | 4/2003 | Morita | G09G 3/3611 323/282 |
| 2005/0213356 A1 | 9/2005 | Yanagida et al. | |
| 2008/0239772 A1* | 10/2008 | Oraw | H02M 3/07 363/60 |
| 2009/0167279 A1 | 7/2009 | Wei et al. | |
| 2011/0204797 A1 | 8/2011 | Lin et al. | |
| 2011/0260702 A1 | 10/2011 | Enenkel | |
| 2012/0249096 A1 | 10/2012 | Enenkel | |
| 2012/0293253 A1 | 11/2012 | Khlat et al. | |
| 2013/0043932 A1 | 2/2013 | Khlat et al. | |
| 2013/0069614 A1 | 3/2013 | Tso et al. | |
| 2014/0306648 A1 | 10/2014 | Le et al. | |

* cited by examiner

*Primary Examiner* — Gustavo Rosario Benitez
(74) *Attorney, Agent, or Firm* — Aka Chan LLP (57) ABSTRACT

A voltage converter includes at least one charge pump voltage converter circuit. The voltage converter generates three voltages (e.g., 1.2 volts, 2.5 volts, and 1.8 volts) for an electronic system, which can be a smartphone or electronic tablet or other device. The charge pump voltage converter circuit provides an output voltage that is an average of its input voltages. Compared to a low dropout regulator, charge pump voltage converter circuit has high efficiency. This voltage converter will save power compared to converters using a low dropout regulator. An implementation of the voltage converter can includes at least two charge pump voltage converter circuits to generate to different output voltages.

22 Claims, 9 Drawing Sheets

FLOATING CHARGE PUMP VOLTAGE CONVERTER

CROSS-REFERENCE TO RELATED APPLICATIONS

This patent application is a continuation of U.S. patent application Ser. No. 14/455,753, filed Aug. 8, 2014, issued as U.S. Pat. No. 9,673,699 on Jun. 6, 2017, which claims the benefit of U.S. patent application 61/863,820, filed Aug. 8, 2013. These applications are incorporated by reference along with all other references cited in this application.

BACKGROUND OF THE INVENTION

The invention is related to the field of electrical circuits and more specifically to voltage converter circuits for electronic circuitry.

Electronic circuitry is used wide range of applications, systems, and devices including computer monitors, televisions, instrument panels, aircraft cockpit displays, signage, laptop computers, video players, music players, gaming devices, clocks, watches, calculators, telephones, smartphones, tablets, and many other devices.

These devices can include transistors, logic gates, memory, display panels, and other circuits and technologies. The electronics are used in a system typically operate at different voltage levels from each other. But external voltage is supplied from a direct current (DC) supply or a battery source is at a single voltage level.

Therefore, there is a need for circuitry to perform DC-to-DC voltage conversion to generate voltages at different voltages levels that allow the electronic system of the system to operate properly. And it is desirable that the voltage conversion is performed with higher efficiency to reduce power consumption.

BRIEF SUMMARY OF THE INVENTION

A voltage converter includes at least one charge pump voltage converter circuit. The voltage converter generates three voltages (e.g., 1.2 volts, 2.5 volts, and 1.8 volts) for an electronic system, which can be a smartphone or electronic tablet or other device. The charge pump voltage converter circuit provides an output voltage that is an average of its input voltages. Compared to a low dropout regulator, charge pump voltage converter circuit has high efficiency. This voltage converter will save power compared to converters using a low dropout regulator. An implementation of the voltage converter can includes at least two charge pump voltage converter circuits to generate to different output voltages.

Circuitry that performs voltage conversion with higher efficiency will reduce power consumption. This helps increase the run time of battery operated devices. In a specific implementation, the circuitry includes a floating charge pump circuit including two different input voltages. For example, neither of the two voltage inputs is connected to ground in a specific implementation. The output voltage of the floating charge pump circuit is an average of the two voltage inputs.

In an implementation, a circuit includes: an input voltage; a first buck circuit, connected to the input voltage, generating a first output voltage; a second buck circuit, connected to the first input voltage, generating a second output voltage, where the second output voltage is higher than the first output voltage; and a low dropout regulator circuit, connected to the second output voltage, generating a third output voltage, where the third output voltage is between the first and second output voltages.

In an implementation, a circuit includes: an input voltage; a first buck circuit, connected to the input voltage, generating a first output voltage; a second buck circuit, connected to the first input voltage, generating a second output voltage, where the second output voltage is higher than the first output voltage; and a charge pump circuit, connected to the first and second output voltages, generating a third output voltage, where the third output voltage is between the first and second output voltages.

In an implementation, a circuit includes: an input voltage; a buck circuit, connected to the input voltage, generating a first output voltage; a first charge pump circuit, connected to the first input voltage, generating a second output voltage, where the second output voltage is lower than the first output voltage; and a second charge pump circuit, connected to the first and second output voltages, generating a third output voltage, where the third output voltage is between the first and second output voltages.

In various implementations, the charge pump circuit includes: a first switch, connected between the first output voltage and a first node; a second switch, connected between the first node and the third output voltage; a third switch, connected between the third output voltage and a second node; a fourth switch, connected between the second node and the second output voltage; and a charge pump capacitor, connected between the first and second nodes.

The first and third switches are connected to a first signal line, and the second and fourth switches are connected to a second signal line. A signal on the first signal line is out of phase with a signal on the second signal line.

The first node is connected to a positive plate of the charge pump capacitor, and the second node is connected to a negative plate of the charge pump capacitor.

The first charge pump includes: a first switch, connected between the first output voltage and a first node; a second switch, connected between the first node and the second output voltage; a third switch, connected between the second output voltage and a second node; a fourth switch, connected between the second node and a ground voltage; and a first charge pump capacitor, connected between the first and second nodes.

The second charge pump includes: a fifth switch, connected between the first output voltage and a third node; a sixth switch, connected between the third node and the third output voltage; a seventh switch, connected between the third output voltage and a fourth node; an eighth switch, connected between the fourth node and the second output voltage; and a second charge pump capacitor, connected between the third and fourth nodes.

The first and third switches are connected to a first signal line, and the second and fourth switches are connected to a second signal line. A signal on the first signal line is out of phase with a signal on the second signal line.

The first and third switches are connected to a first signal line, the second and fourth switches are connected to a second signal line, the fifth and seventh are connected to a third signal line, and the sixth and eight switches are connected to a fourth signal line.

A first signal on the first signal line is out of phase with a second signal on the second signal line, and third signal on the third signal line is out of phase with a fourth signal on the fourth signal line. Alternatively, a first signal on the first signal line is out of phase with a second signal on the second signal line, the first signal is on the third signal line, and the second signal is on the fourth signal line.

The first node is connected to a positive plate of the first charge pump capacitor, and the second node is connected to a negative plate of the first charge pump capacitor. The first node is connected to a positive plate of the first charge pump capacitor, the second node is connected to a negative plate of the first charge pump capacitor, the third node is connected to a positive plate of the second charge pump capacitor, and the fourth node is connected to a negative plate of the second charge pump capacitor.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
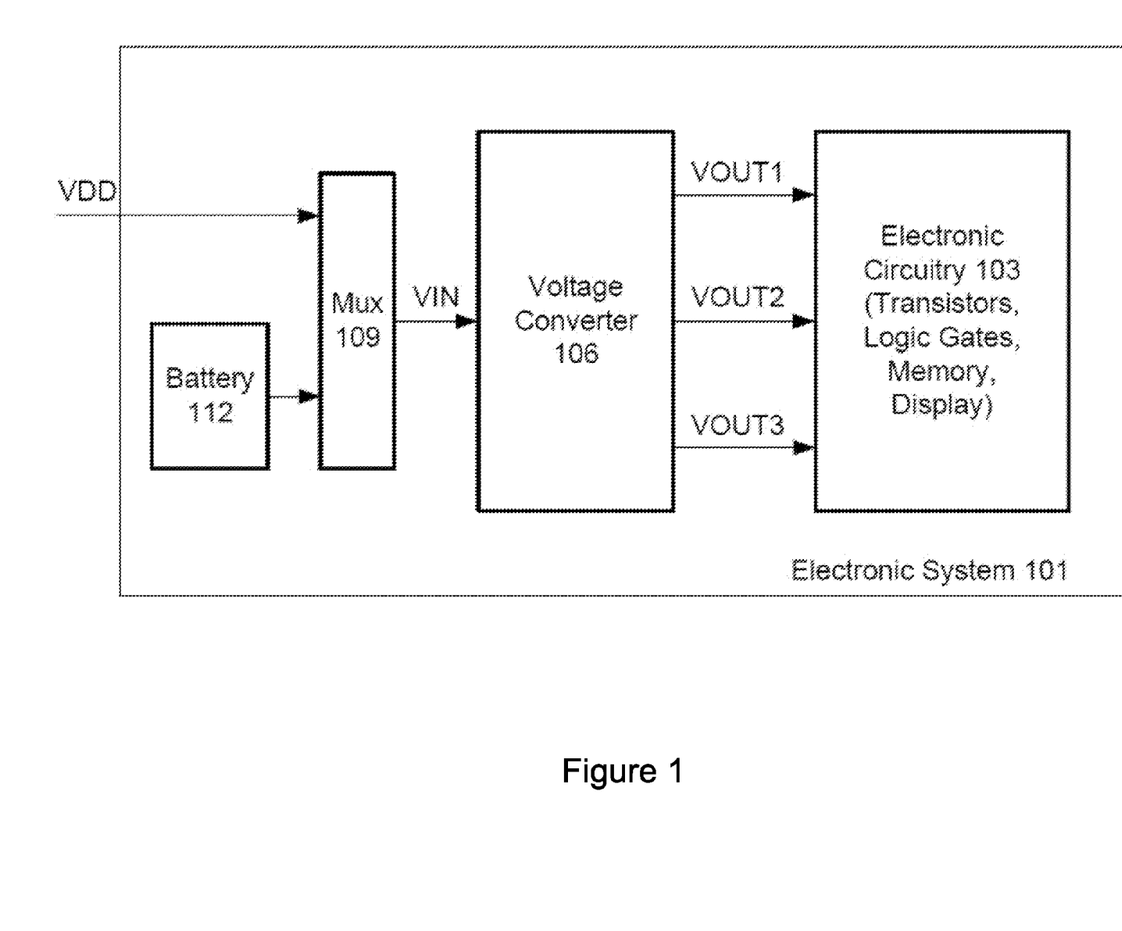
FIG. 1 shows a block diagram of an electronic system.

FIG. 1 shows a block diagram an electronic system or electronic device 101. The electronic system includes electronic circuitry 103, a voltage converter 106, a multiplexer 109, and a battery source 112.

In a specific implementation, the system is a smartphone or tablet computer, but can include device types such as computer monitors, televisions, instrument panels, aircraft cockpit displays, signage, laptop computers, video players, music players (e.g., Apple's iPod product family), gaming devices, cameras, clocks, watches, calculators, telephones, smartphones (e.g., Apple's iPhone product family, Google's Nexus product family, Samsung's Galaxy product family), tablets (e.g., Apple's iPad product family, Google's Nexus product family, or Samsung's Galaxy product family), and many others.

The electronic circuitry includes, among other components, transistors (e.g., bipolar, MOS, or others), logic gates (e.g., NAND, NOR, AND, OR, XOR, or others), memory (e.g., RAM, flash, or others), display (e.g., flat panel, liquid crystal display (LCD), organic light emitting diode (OLED), or others), and combinations of these. The electronic circuitry and components can include central processing units (CPUs), analog-to-digital converters (ADCs), digital-to-analog converters (DACs), amplifiers and operational amplifiers (e.g., op amp), and many others.

To operate, power is supplied to the electronic circuitry at one or more voltage levels. For example, the electronic circuitry can use three voltages, VOUT1, VOUT2, and VOUT3, at three different voltage levels. These voltages are generated by voltage generator 106. In a specific implementation, such as for a tablet device, the voltages are 1.2 volts, 2.5 volts, and 1.8 volts. These voltages can be used for the logic supplies for the timing controlling and source driver integrated circuit (IC). The 2.5-volt supply is capable of supplying up to about 50 milliamps, the 1.8-volt supply is capable of supplying up to about 50 milliamps, and the 1.8-volt supply is capable of supplying up to about 200 to about 300 milliamps.

Voltage converter 106 generates output voltages VOUT1, VOUT2, and VOUT3 from an input voltage VIN. VIN can be from a DC supply (e.g., VDD or VCC) or battery 112, in case of a portable device or device with battery source (such as for battery back-up). In system 101, VDD or battery 112 is passed through multiplexer 109 to VIN of the voltage converter. For a system without a battery source, VDD is directly connected to VIN, and the battery and multiplexer can be omitted.

Typically VDD is a regulated DC source at about 3.3 volts. The DC source can vary and range plus or minus about 10 percent (e.g., ranging from about 2.97 volts to about 3.63 volts). These variations can of because of fluctuations in an AC supply to the DC source, temperature changes, variations in components (e.g., size variation of capacitors, resistors, and inductors), and other factors.

The battery source can be made from various battery chemistry technologies, such as lithium ion, lithium polymer, lithium air, nickel metal hydride, nickel cadmium, and others. Depending on the chemistry, the voltage output from the battery cell can vary. For a single lithium ion cell, the output voltage is typically about 3.7 volts, but can vary from a minimum of about 3.2 volts (or 2.9 volts in some cases) to a maximum of about 4.2 volts. Further, depending on an amount of charge stored in the battery, the output voltage will vary over time until the battery is discharged or depleted.

Figure 2:
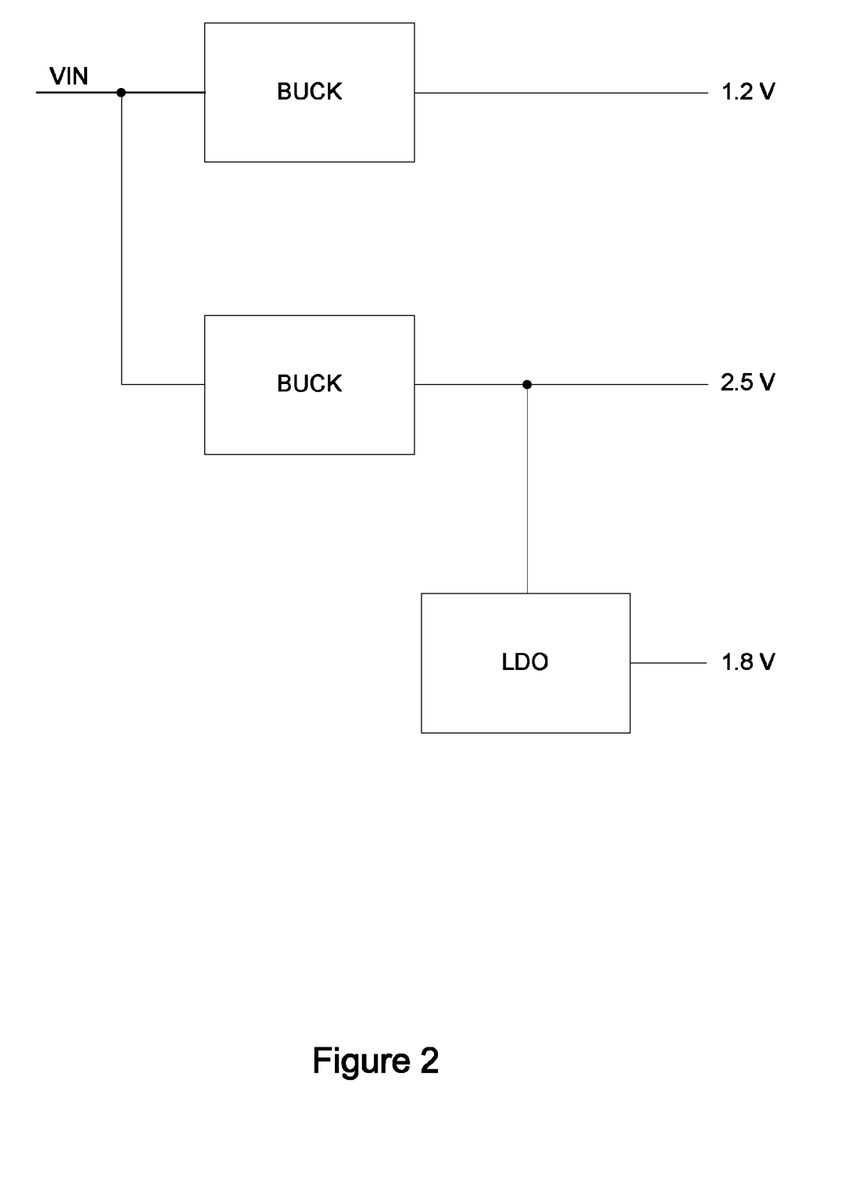
FIG. 2 shows an implementation of a voltage generator to generate three different voltages using buck converters.

The voltage converter is a DC-to-DC converter that takes the VIN voltage and generates the output voltages for the electronic circuitry of the system. FIG. 2 shows an implementation of a voltage converter where VOUT1 (1.2 volts) is generated by a buck converter from VIN, VOUT2 (2.5 volts) is generated by a buck converter from VIN, and VOUT3 (1.8 volts) is generated by a low dropout regulator (LDO) from VOUT2.

A buck converter is a step-down DC-to-DC converter that uses inductors. Buck converters have a theoretical efficiency of 100 percent. But in actual use, the buck converter for VOUT1 (1.2 volts) has an efficiency of about 85 percent and VOUT2 (2.5 volts) of about 92 percent. The inductor of a Buck converter is an external or off-chip inductor, which is generally costly and requires some space on a printed circuit board.

A low dropout regulator is a linear voltage regulator which can operate with a very small input-to-output differential voltage. The main components are a power FET and a differential amplifier (error amplifier). One input of the differential amplifier monitors the fraction of the output determined by the resistor ratio of R1 and R2. The second input to the differential amplifier is from a stable voltage reference (bandgap reference). If the output voltage rises too high relative to the reference voltage, the drive to the power FET changes to maintain a constant output voltage.

An efficiency of the low dropout regulator for VOUT3 is fixed by the ratio of VOUT3/VIN3, where VIN3 is the VIN to the low dropout regulator. Therefore, an efficiency for generating VOUT3 is about 1.8/2.5 which is about 72 percent. This is much less than the theoretical efficiency of 100 percent of the buck converters. Therefore, improving the power efficiency for the generation of VOUT3 (1.8 volt) will improve the overall efficiency of the system. And this will improve battery run time of the device.

Another technique for performing DC conversion is to use a charge pump (CP). A charge pump is a DC-to-DC converter that uses capacitors as energy storage elements to create either a higher or lower voltage power source. The efficiency of a charge pump is typically 90 to 90 percent, which is better than for a low dropout regulator.

Figure 3:
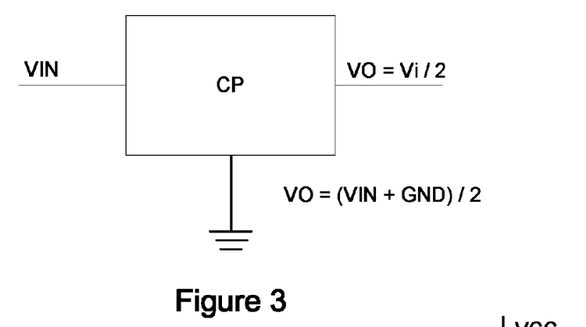
FIG. 3 shows a charge pump voltage converter.

FIG. 3 shows a charge pump connected to an input voltage VIN and ground, and generating an output voltage VO. The output voltage of this charge pump will be (VIN plus ground)/2 or VIN/2. Specifically, the output voltage VO for the charge pump is ½ of the input voltage VIN.

Figure 4A:
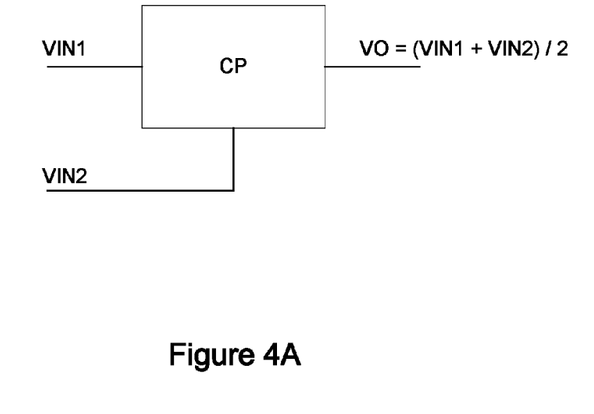
FIGS. 4A and 4B show a further implementation of a charge pump voltage converter.

FIG. 4A shows a charge pump configuration having inputs VIN1 and VIN2. In the FIG. 3 configuration, VIN2 is connected to ground. But in this configuration, VIN2 is connected to another voltage value. The output voltage of this charge pump will be (VIN plus VIN2)/2 or VIN/2. Specifically, the output voltage VO for the charge pump is an average of input voltages VIN1 and VIN2.

Figure 4B:
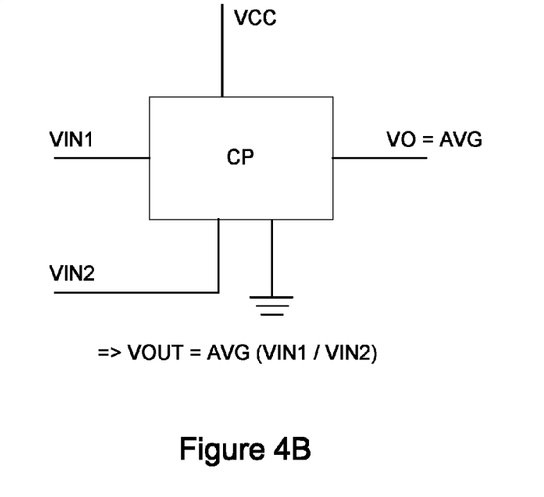

FIG. 4B shows the charge pump configuration of FIG. 4A with connections to VCC and ground. The charge pump configuration in FIGS. 4A and 4B can be referred to as a floating charge pump (FCP). In a specific implementation, the charge pump is unregulated, but in other implementations, the charge pump is regulated. Compared to a buck converter, by eliminating the inductor, these switched capacitor converters provided small solution footprint and a simpler design.

Figure 5:
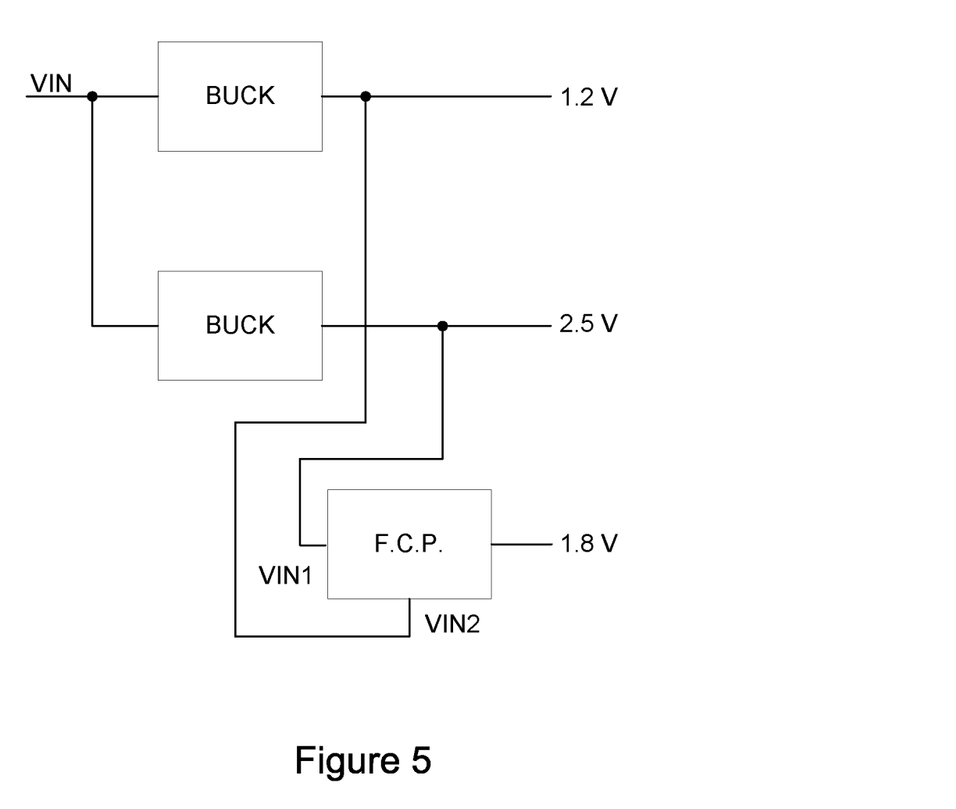
FIG. 5 shows an implementation of a voltage generator using at least one charge pump voltage converter.

FIG. 5 shows an implementation of voltage converter with two buck converters and a charge pump converter. Specifically, compared to the FIG. 2 configuration, instead of using a low dropout regulator for VOUT3 (1.8 volts), a floating charge pump is used instead. VIN1 and VIN2 of the floating charge pump are connected to VOUT1 (1.2 volts) and VOUT2 (2.5 volts). Then, voltage output VO of the floating charge pump (which is VOUT3) will be 1.8 volts (i.e., (1.2+2.5)/2).

Figure 6:
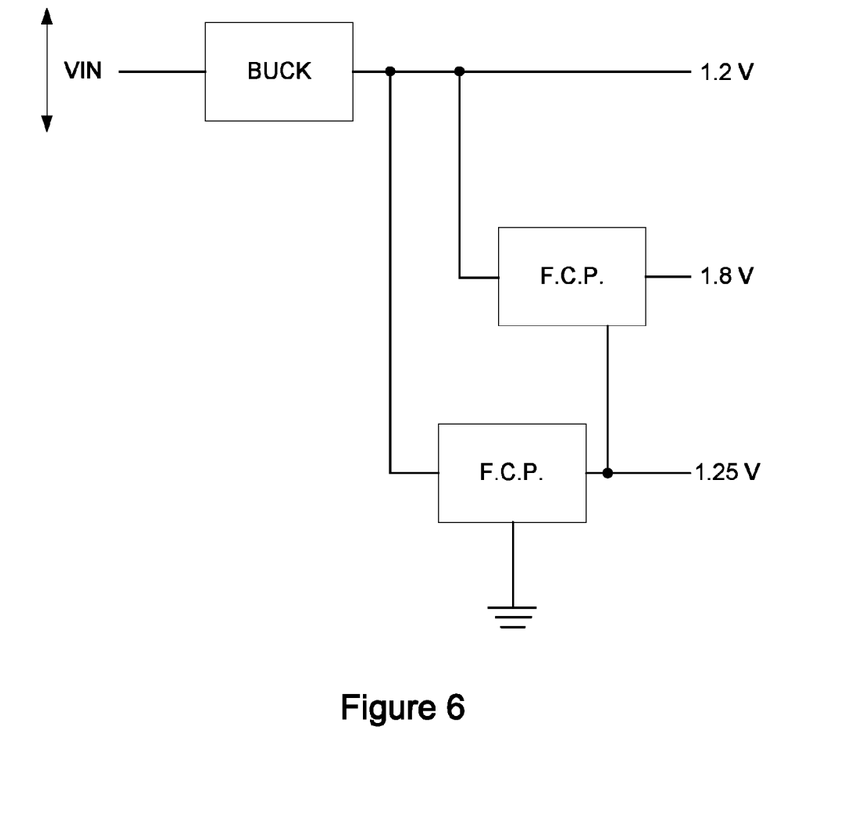
FIG. 6 shows an implementation of a voltage generator using at least two charge pump voltage converters.

FIG. 6 shows another implementation of voltage converter with one buck converter and two charge pump converters. Specifically, voltage VOUT2 (2.5 volts) is generated using a buck converter. Voltages VOUT1 (1.2 volts) and VOUT3 (1.8 volts) are generated by way of floating charge pumps.

Voltage VOUT2 (2.5 volts) is used as an input by a charge pump to generate an output voltage VOUT1 (1.25 volts). In this implementation, VOUT1 is not exactly at 1.2 volts, but rather 1.25 volts, but this is still in within a 10 percent margin range of 1.2 volts that the electronic circuitry will work properly.

Voltage VOUT3 (1.8 volts) is generated by VOUT1 (1.25 volts) and VOUT2 (2.5 volts), which is more specifically 1.875 volts. Even though 1.875 volts is not exactly at 1.8 volts, this is this is still in within a 10 percent margin range of 1.8 volts that the electronic circuitry will work properly.

Compared to the FIG. 2 voltage converter configuration, by using two removing one buck converter and an a low dropout regulator, this reduces the number of external or off chip inductors needed, and also increases an energy efficiency of the device. This will improve the battery run time of the device.

Figure 7:
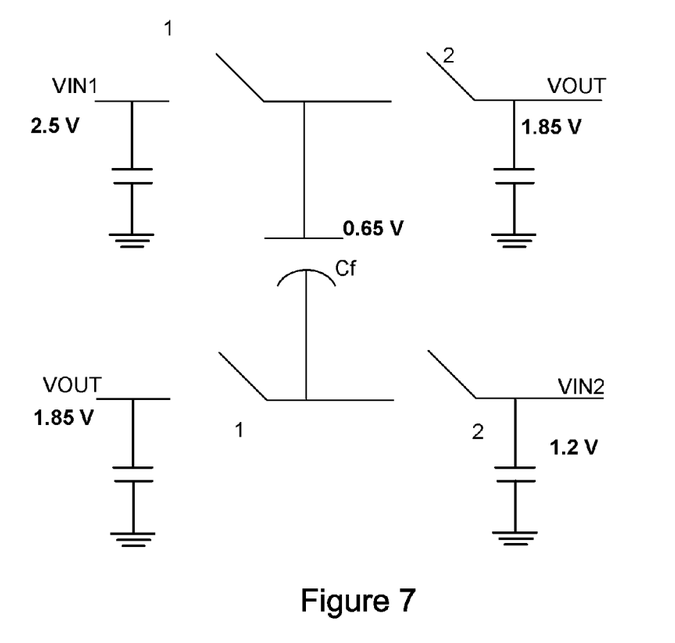
FIG. 7 shows a charge pump circuit.

FIG. 7 shows a specific implementation of charge pump. The charge pump has a capacitor Cf connected to four switches. A first switch connects a positive plate of the capacitor to VIN1. A second switch connects a positive plate of the capacitor to VOUT. A third switch connects a negative plate of the capacitor to VOUT. And a fourth switch connects a negative plate of the capacitor to VIN2.

Also there are capacitors between VIN1 and ground, VOUT and ground, and VIN2 and ground. There can be external capacitors, internal capacitors, or parasitic capacitances, and are used to stabilize the voltages at those nodes.

In operation, the switches are connected to a clock signal. The clock signal has a 50 percent duty cycle. Pairs of switches operate out of phase with each other. Specifically, the first and third switches are closed during a first phase and opened during a second phase. The second and fourth are open during the first phase and closed during the second phase.

In a specific implementation, VIN1 is 2.5 volts and VIN2 is 1.2 volts. Then VOUT will be 1.85 volts where there is a 0.65 volt different across the capacitor.

Figure 8A:
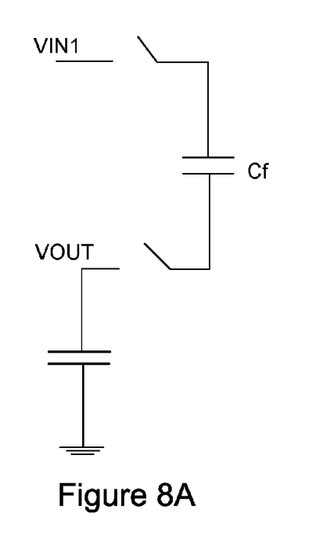
FIGS. 8A and 8B show phases of operation of the charge pump circuit.
Figure 8B:
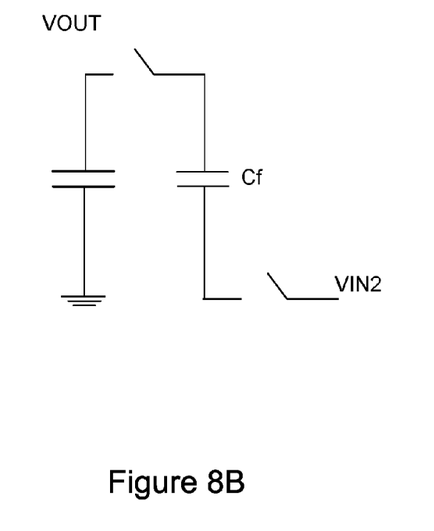

FIG. 8A shows a circuit diagram of the FIG. 7 circuit during the first phase. FIG. 8B shows a circuit diagram of the FIG. 7 circuit during the second phase.

This technique of using a charge pump to obtain an output voltage that is an average its two input voltages can be used in a variety of applications, such as voltage converter as described above, integrated in a power management integrated circuit (PMIC), standalone, discrete component use, integrated circuit use, and many others.

Figure 9:
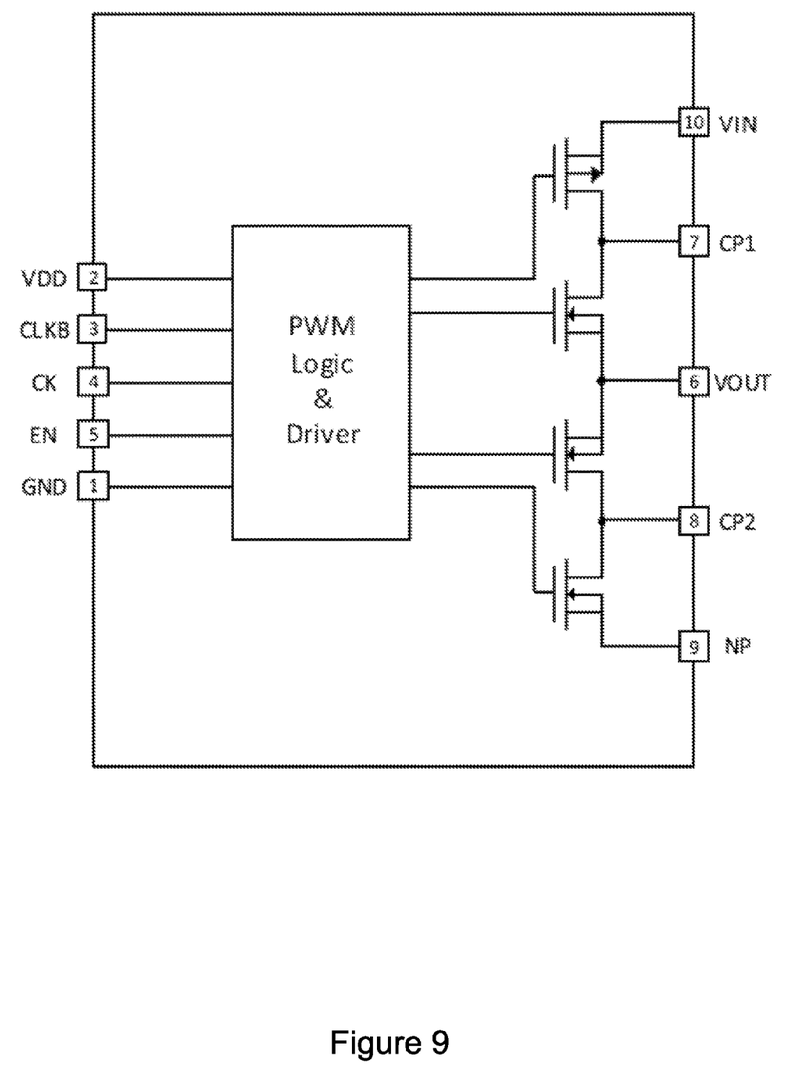
FIG. 9 shows a power management integrated circuit.

As an example, FIG. 9 shows a power management integrated circuit. The integrated circuit has ten external pins: Pin 1 is ground. Pin 2 is VDD, integrated circuit supply. Pin 3 is CLKB, inverted clock output. Pin 4 is CK, clock input, 50 percent duty cycle clock. Pin 5 is EN, enable pin; set EN to high to enable output. Pin 6 is OUT, charge pump output. Pin 7 is CP1, first pin for fly capacitor. Pin 8 is for CP2, second pin for fly capacitor. Pin 9 is NP, which is connected to ground for 1.2-volt output or connected to 1.2-volt supply for 1.8-volt output. Pin 10 is VIN, supply for charge pump.

The VIN and CP1 pins are connected to first node of a first capacitor (e.g., transistor connected as a capacitor), while a second node of the capacitor is connected to pulse width modulation (PWM) logic and drive block. The CP1 and VOUT pins are connected to first node of a second capacitor, while its second node is connected to the PWM block. The VOUT and CP2 pins are connected to first node of a third capacitor, while its second node is connected to the PWM block. The CP2 and NP pins are connected to first node of a fourth capacitor, while its second node is connected to the PWM block.

Figure 10:
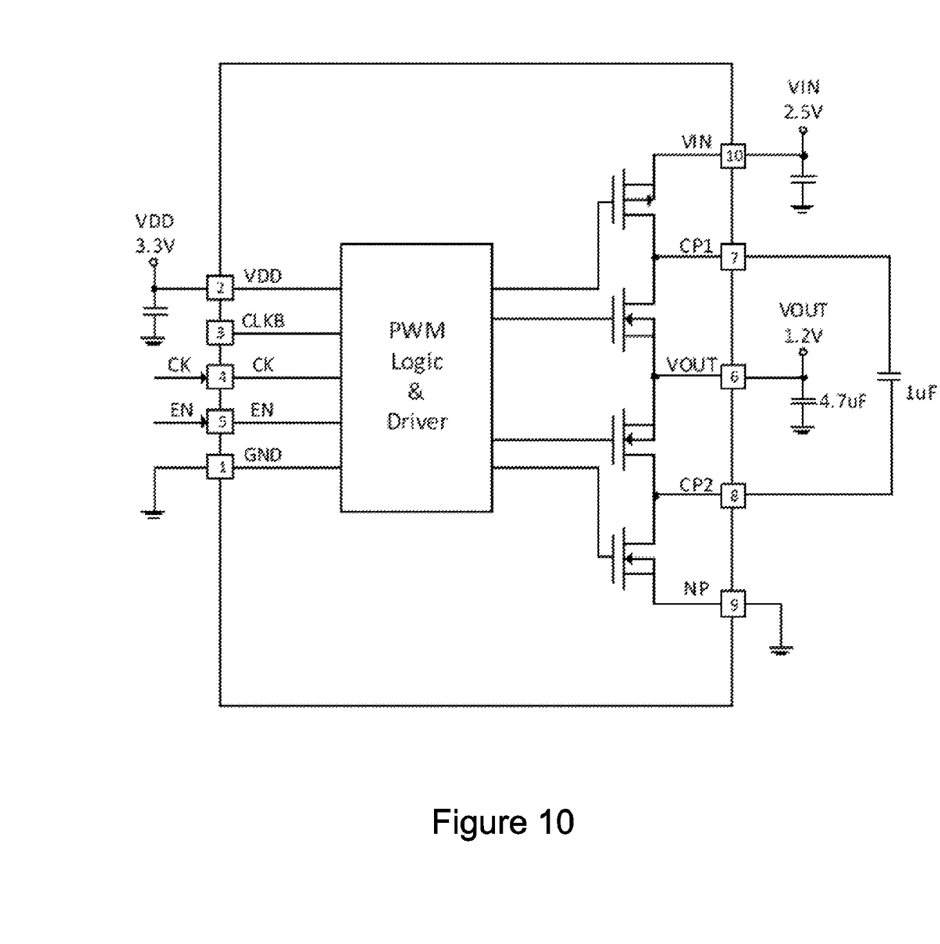
FIG. 10 shows the power management integrated circuit in a single charge pump application.

FIG. 10 shows the power management integrated circuit configured in a single charge pump application. There is a VOUT voltage of 1.2 volts.

Figure 11:
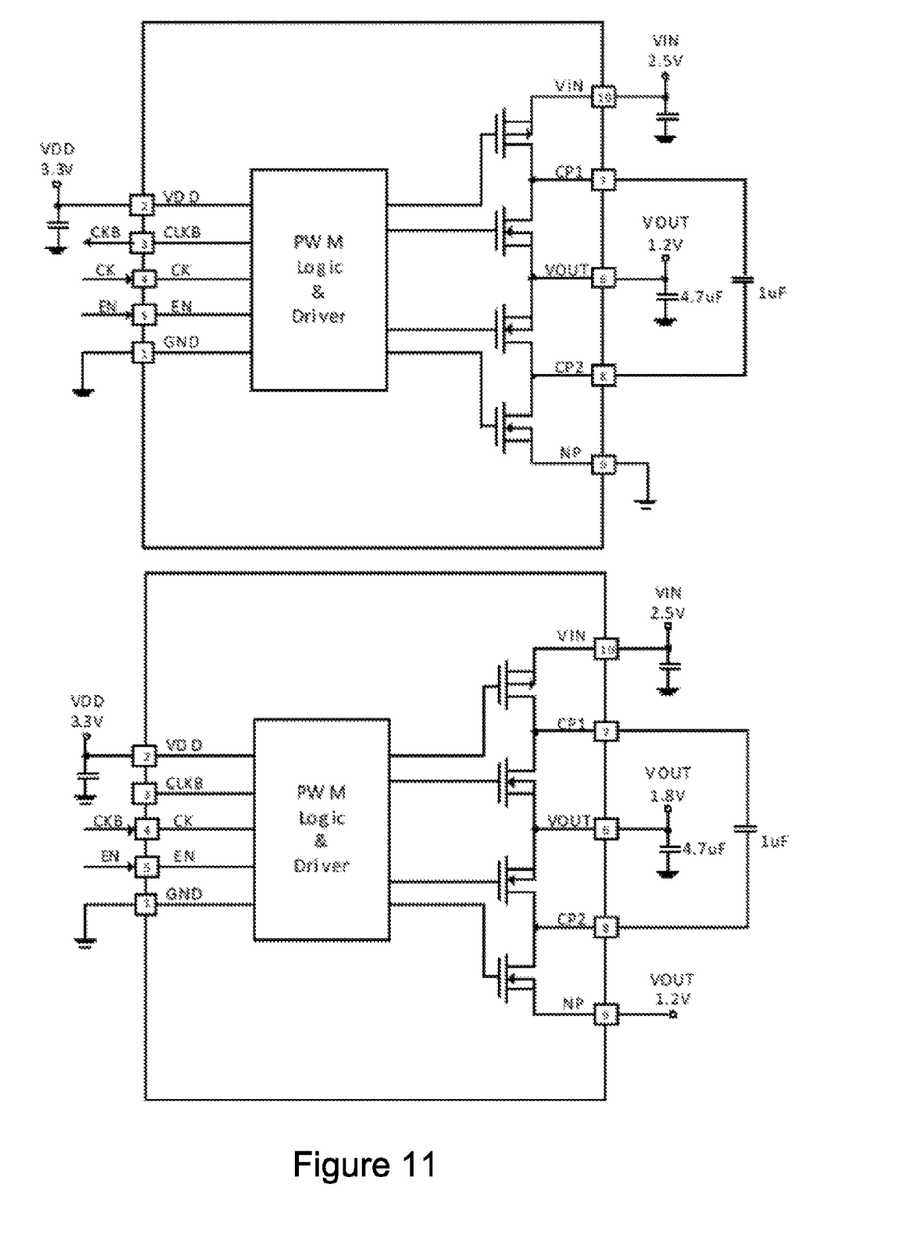
FIG. 11 shows two power management integrated circuits in a two charge pump application.

FIG. 11 shows two power management integrated circuits configured in a two charge pump application. There are two VOUT voltages of 1.2 volts and 1.8 volts.

This description of the invention has been presented for the purposes of illustration and description. It is not intended to be exhaustive or to limit the invention to the precise form described, and many modifications and variations are possible in light of the teaching above. For example, some specific voltage levels are described, but other voltage levels can be used and generated instead. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing an input voltage;
generating a first output voltage using a first buck circuit, coupled to the input voltage;
generating a second output voltage using a second buck circuit, coupled to the input voltage, wherein the second output voltage is higher than the first output voltage; and
generating a third output voltage using a charge pump circuit, coupled to the first and second output voltages, wherein the first and second output voltages are inputs to the charge pump circuit, the third output voltage is an output of the charge pump circuit, and the third output voltage is between the first and second output voltages, and the charge pump circuit comprises:
a first switch, coupled between the first output voltage and a first node; and
a second switch, coupled between a second node and the second output voltage.

2. The method of claim 1 wherein the charge pump circuit comprises:
a third switch, coupled between the first node and the third output voltage;
a fourth switch, coupled between the third output voltage and the second node; and
a charge pump capacitor, coupled between the first and second nodes.

3. The method of claim 2 wherein the first and fourth switches are coupled to a first signal line, and the second and third switches are coupled to a second signal line.

4. The method of claim 3 wherein a signal on the first signal line is out of phase with a signal on the second signal line.

5. The method of claim 2 wherein the first node is coupled to a positive plate of the charge pump capacitor, and the second node is coupled to a negative plate of the charge pump capacitor.

6. The method of claim 1 wherein the third output voltage is different from the first output voltage.

7. The method of claim 1 wherein the third output voltage is different from the second output voltage.

8. The method of claim 1 wherein the third output voltage is above a ground voltage level.

9. The method of claim 2 wherein the third output voltage is above a ground voltage level.

10. The method of claim 1 wherein the input voltage is above the first output voltage.

11. The method of claim 1 wherein the input voltage is above the second output voltage.

12. The method of claim 1 wherein the input voltage is above the first and second output voltages.

13. The method of claim 1 wherein the charge pump comprises a current capability to supply at least 2 times more current than provided by the first buck circuit.

14. The method of claim 1 wherein the charge pump comprises a greater current capability than the first buck circuit,
the charge pump comprises a current capability to supply at least about 200 milliamps of current, and the first buck circuit comprises a current capability to supply at least about 50 milliamps.

15. The method of claim 1 wherein the input voltage is from a battery.

16. The method of claim 1 wherein the charge pump comprises a greater current capability than the first buck circuit and the second buck circuit.

17. A method comprising:
providing an input voltage;
using a first buck circuit, generating a first output voltage, wherein first buck circuit is coupled to the input voltage;
using a second buck circuit, generating a second output voltage, wherein the second buck circuit is coupled to the input voltage, and the second output voltage is higher than the first output voltage;
coupling a first switch between the first output voltage and a first node;
coupling a second switch between the first node and a third output voltage, wherein the third output voltage is between the first and second output voltages;
coupling a third switch between the third output voltage and a second node;
coupling a fourth switch between the second node and the second output voltage;
coupling a charge pump capacitor between the first and second nodes;
providing a first signal line, coupled to the first and third switches; and
providing a second signal line, coupled to the second and fourth switches.

18. The method of claim 17 wherein the input voltage is above the first and second output voltages.

19. The method of claim 17 wherein a signal on the first signal line is out of phase with a signal on the second signal line.

20. The method of claim 17 wherein the first output voltage is 1.2 volts, the second output voltage is about 2.5 volts, and the third output voltage is about 1.8 volts.

21. The method of claim 17 wherein the input voltage is from a battery.

22. A method comprising:
providing an input voltage;
using a first buck circuit, coupled to the input voltage, to generate a first output voltage;
using a second buck circuit, coupled to the first input voltage, to generate a second output voltage, wherein the second output voltage is higher than the first output voltage; and
using a charge pump circuit, comprising inputs coupled to the first and second output voltages, to generate a third output voltage, wherein the third output voltage is between the first and second output voltages.

* * * * *